Figure 3:
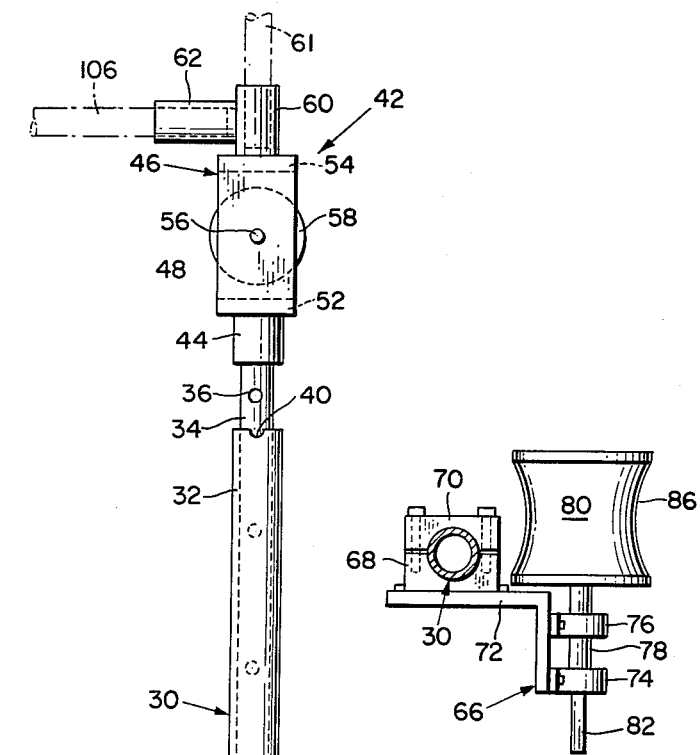

Dec. 14, 1965    G. B. GEBO    3,223,384
POWER PULLING ARRANGEMENT
Filed Sept. 25, 1963    2 Sheets-Sheet 1

INVENTOR.
GEORGE B. GEBO
BY *Neil J. Dowell*
ATTORNEY

Dec. 14, 1965   G. B. GEBO   3,223,384
POWER PULLING ARRANGEMENT
Filed Sept. 25, 1963   2 Sheets-Sheet 2

INVENTOR.
GEORGE B. GEBO
BY
ATTORNEY

United States Patent Office 3,223,384
Patented Dec. 14, 1965

3,223,384
POWER PULLING ARRANGEMENT
George B. Gebo, 15448 Lemac, Van Nuys, Calif.
Filed Sept. 25, 1963, Ser. No. 311,428
8 Claims. (Cl. 254—134.3)

The invention relates to a power pulling arrangement and has particular utility in the electrical field as an aid to pulling cable and wire or cable and wire combination through installed conduit.

Persons skilled in the construction field will be familiar with the fact that sound safety practice requires that all current carrying cable and wire be installed in appropriately sized conduit which, for example, may be arranged to interconnect service entrance box and distribution box centers. Usually employed construction procedure requires that the service entrance and distribution box centers, the interconnecting conduit and the like be placed in the new building at an early stage in the construction thereof. At this point in such construction the boxes and conduit are empty and the electrical conductors are installed at a later stage of the construction. In large commercial and industrial building, the conduit employed may be required to have a diameter of two to six inches or even greater and when installed will be bent at various angles, offset, elbowed or the like.

The conductors employed in conduit of the sizes here under consideration frequently have nominal diameters of an inch or more. Material economy dictates that as many conductors as possible be place in each conduit. The length of conduit run is, of course, variable depending upon the physical features of the building, however, runs of several hundred feet are not uncommon. These facts, namely, the length and erratic path of the conduit run, the size and number of conductors placed in each conduit make the job of pulling the conductors through said conduit an extremely difficult one.

For example, considering conduit of five inch diameter it is not uncommon that a total load as a result of conductor pulling exceeding 9000 pounds is developed. Patently such loads require force multiplying equipment.

Conduit runs will also communicate with the distribution boxes in a variety of attitudes. For example, the conduit may communicate horizontally with the box, that is, from the left, right or perpendicular to the general plane of the box when the installed box is viewed from the access position. Also the conduit may communicate with the box vertically, that is, from above or below the box when viewed from the access position. Occasionally, a given conduit may communicate when the box is in angular relation to both the horizontal and vertical.

Thus the problem of conductor installation requires the ability to develop high pulling forces in a variety of physical attitudes.

To better understand the herein disclosed invention brief consideration should be given to the procedure followed in conductor installation. Initially, a very light lead line is fed through the conduit run. This may be accomplished by first shooting a small weight with the line attached thereto through the conduit. The lead line is then connected to a steel cable or pull rope (manila or plastic) which is fed through the run. A mechanical connection is then provided between the cable or rope and the conductors. The cable or rope and the connected conductors are then pulled through the conduit. Where steel conduit is employed a steel pull cable may be used. Recently however aluminum pipe has been employed in large diameter conduit. It has the advantage of light weight and ductility which facilitates bending and installation. With aluminum conduit a rope pull line is more desirable in that a steel line tends to gouge the relatively soft aluminum conduit surface.

To develop the pulling force required, prior art practice has dictated that a wide variety of force multplying devices be used. For example, block and tackle, windlass and powered winches have been used. Because of the wide difference of the physical features of each installation, the equipment referred to above was usually specially rigged for each job. Set up time alone, therefore, represented an important cost factor for each job. Frequently set up time could not even be estimated accurately before the job was actually begun. In many cases special temporary scaffolding would have to be built before conductor pulling could commence.

With the above in mind it is a primary object of the present invention to provide a pulling device which substantially improves the efficiency of the conductor pulling operation.

It is a further object of the present invention to provide a pulling device that eliminates the necessity of special rigging resulting from variation in physical building features from job to job.

It is also an object of the invention to provide a pulling device that is virtually self contained and adjustable to meet a wide variation in physical features of different job locations.

The disclosed invention has other advantages such as, compactness, light weight, adaptability to conventional and readily available power sources, safe operation and fast set up. Additionally, the disclosed device may be used as a lift to aid in the positioning of heavy articles.

Specifically, the herein disclosed invention comprehends an elongated load member arranged for operative association with a power driven capstan. A plurality of pulleys, which may be selectively used, are journally mounted on the load member to act as cable and rope guides. In the preferred embodiment, the load member is longitudinally extensible to facilitate pulley location. The load member is further provided with adaptors or collars to accommodate the attachment of lengths of conduit pipe and thereby facilitate device bracing as will hereinafter be described. The preferred embodiment additionally is provided with a base or supporting member to which the primary member is pivotally attached thus facilitating positioning of the primary member in angular relation to the vertical and horizontal.

Figure 1:
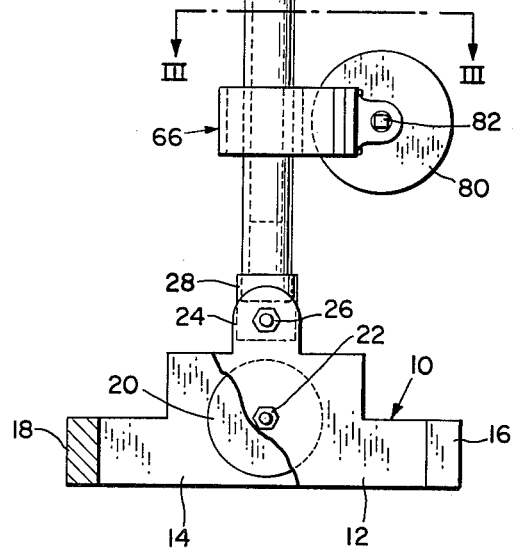
Figure 2:
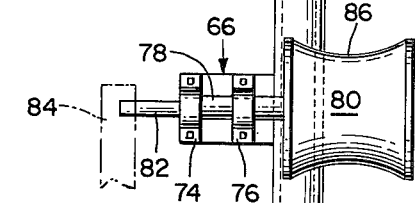
Figure 4:
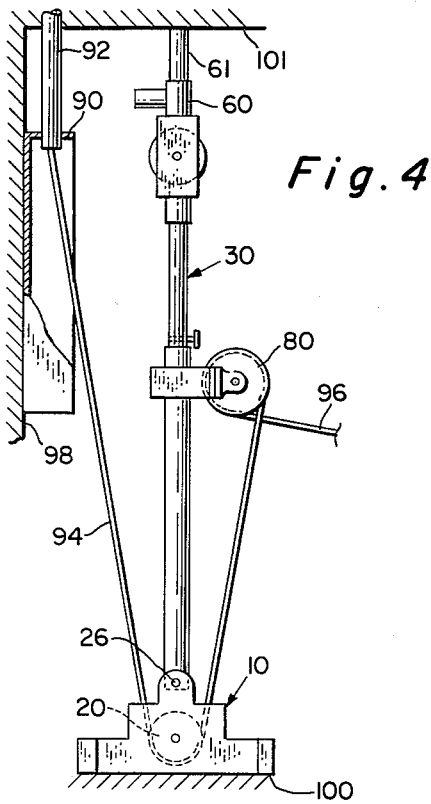
Figure 6:
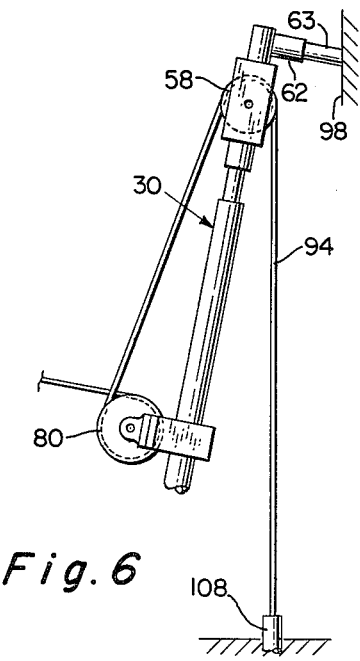
Figure 5:
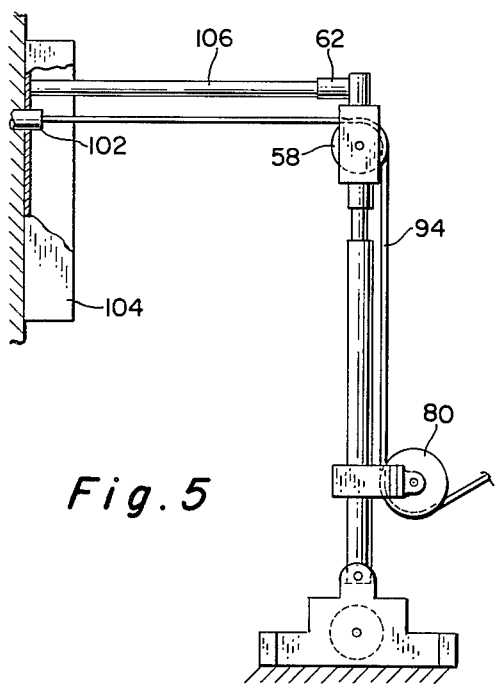
Figure 7:
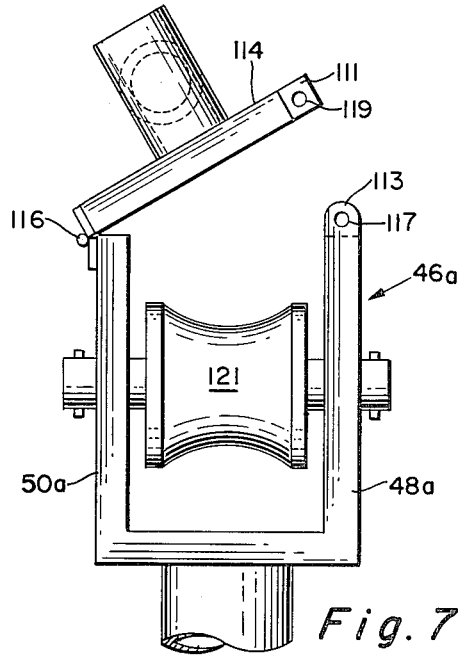

These and other features and advantages of the disclosed invention will become apparent in the course of the following description and from an examination of the associated drawings, wherein:

FIGURE 1 is a partially fragmentary side elevational view showing a preferred embodiment of the invention, FIGURE 2 is a partially fragmentary end elevational view of the structure shown in FIGURE 1, FIGURE 3 is a sectional view taken along the line III—III of FIGURE 2, FIGURE 4 is a side elevational view illustrating a typical vertical downward pull, FIGURE 5 is a side elevational view illustrating the device undertaking a typical horizontal pull, FIGURE 6 is a fragmentary side elevational view illustrating the device when employed in a typical vertical upward pull, and FIGURE 7 is a fragmentary detail view showing an alternate housing arrangement.

Describing the invention in detail, attention is initially directed to FIGURES 1 and 2. The numeral 10 generally indicates a base or device supporting member. The base comprises generally paralled channels 12 and 14 and joining cross channels 16 and 18. A first pulley 20 is journally mounted as at 22 to the channels 12 and 14. While the base 10 is here shown of welded channel construction it will be understood that it may be cast or otherwise fabricated. However, light materials such as aluminum or magnesium are preferred in all structural parts in that they add to ease of portability and set up.

The paralled channels 12 and 14 are further provided with upstanding bosses 23 and 24, respectively. The bosses 23 and 24 are provided with aligned apertures to journally receive pivot pin 26, the latter thereby pivotally connecting collar 28 to the base 10. The collar 28 threadably connects to the lower end of elongated load bearing member, indicated generally at 30. The main load bearing member 30 comprises two segments 32 and 34 arranged for longitudinal movement relative to each other. For example, the segment 32 may be a hollow tubular pipe arranged to telescopically receive segment 34. The segments 32 and 34 may be conventional tubular conduit. It will be noted that the segment 34 is provided with a plurality of axially spaced transverse pin holes 36, 36. The holes 36 complementally receive locking pin 38, the latter being seatable in notches 40, 40 formed in the upper end of segment 32.

An upper pulley assembly is indicated generally at 42. Said assembly comprises a collar 44 threadably secured to the upper end of segment 34, and if desired, set screws (not shown) may be provided to lock same in position thereon. A pulley housing 46 comprising side walls 48 and 50 and end walls 52 and 54 is fixedly secured to the collar 44. The walls 48 and 50 are provided with aligned apertures to receive pin 56, the latter offering journal mounting for the upper pulley 58. Open ended collars 60 and 62 are fixedly secured to the upper portion of the pulley assembly. It will be noted that the long axis of the collars 60 and 62 preferably fall within the plane of rotation of the pulleys 20 and 58 and the long axis of the load bearing member 30.

In the preferred embodiment of the invention a mounting bracket, indicated generally at 66, is provided and is secured to the load bearing member 30 by bolted clamp elements 68 and 70 or other suitable means. The bracket 66 comprises plate 72, the latter conventionally mounting a pair of journal bearings 74 and 76. The bearings 74 and 76 are preferably of the self-aligning type and rotatably receive shaft 78, the latter providing cantilever mounting for pull capstan 80. End 82 of shaft 78 may be provided with hex or square configuration to accommodate attachment of conventional power unit 84. The power unit 84 is here shown in phantom in that it per se does not form a direct part of the present invention. Many portable power units are commercially available and suitable for disclosed purposes and well known to those skilled in the electrical construction industry.

The peripheral surface of the capstan 80 is provided with a concave arc surface 86 and the left hand segment of such surface (FIGURE 2) is preferably aligned with the general plane of pulley rotation, the reason for such construction being hereinafter described. If desired the capstan 80 may be mounted at other points on the device such as on base 10.

Consideration will now be given to the operation and utility of the herein disclosed invention and attention therefore is directed to FIGURE 4. In this figure the numeral 90 indicates a conventional electrical distribution box having conduit 92 communicating therewith. A pull rope or cable 94 has, in the manner above described, been threaded through the conduit and extended downwardly operatively engaging the pulley 20 and upwardly therearound whereat several turns thereof are placed around the peripheral surface 86 of the capstan 80. The free end of rope 90 is indicated at 96 and the building wall, floor and ceiling are shown at 98, 100 and 101, respectively. Note that the load bearing member 30 has been pivoted above pin 26 to generally vertical position. A length of conduit 61 may be fitted to collar 60 and the load bearing member 30 axially adjusted to brace the conduit against the ceiling. The end of the rope 94 which is not shown is connected to conductors as above described.

To begin the conductor pull, power source 84 is energized inducing rotation of capstan 80. It will be noted that the lead turn of the rope 94 engages the left portion (FIGURE 2) of the capstan surface 86 and several more turns are spirally wound therearound. As the capstan picks up the load of the conductors the arced capstan surface forces the spirally wound rope to the right over surface 86 and the varying diameter increases the frictional load on the rope. As the capstan turns the operator feeds the free end of the rope to the floor. It will be noted that the load bearing member 30 is firmly braced against ceiling 101 and is positioned to provide approximately equal rope angles on opposite sides thereof.

FIGURE 5 further illustrates the utility of the device. Here a horizontal pull is contemplated from the conduit 102 in box 104. Additionally it may be required that a determined length of conductor be pulled through the conduit and into the box for the required electrical make-up therein. For this purpose or merely set-up convenience, a desired length of conduit 106 is mounted in collar 62 and the opposite end is placed in abutting relation with the box 104 adjacent conduit 102. The rope 94 is positioned around the pulley 58 and in multiple turn relationship with the capstan 80. As the pulley is commenced, as above described, conductor induced load is resisted through the extension 106. The preselected spacing offered by the conduit 106 allows the desired length of conductor make-up to be pulled from the conduit 102.

Partially fragmentary FIGURE 6 is illustrative of a typical vertical pull from conduit 108. Note that pull rope 94 operatively engages only pulley 58 and then is directed downwardly to spirally surround capstan 80. Collar 62 contains pipe 63 and is arranged to abut the wall 98 and the load member 30 pivotally angled from the vertical so that it forms approximate equilateral triangles with segments of the rope 94 on opposite sides of the pulley 58. Pulley 58 is approximately aligned with conduit 108 and a substantially direct pull results.

Directing attention to FIGURE 7 an alternate upper housing construction 46a is shown, which may be substituted for housing 46 of the above described embodiment. Note, in this construction side walls 48a and 50a are provided. An upper plate 114 is pivotally connected to wall 50a as at 116. Plate 114 is provided with a cavity or notch 111 which receives upwardly projecting boss 113, when the plate 114 is pivoted to abut the upper edge of wall 48a. The boss 113 and plate 114 may be provided with alignable holes 117 and 119 which may receive a conventional locking pin (not shown) when plate 114 is in closed position. It will thus be understood that the plate 114 of the housing 46a may be pivoted to the open position to facilitate assembly of pull cable or conduit to the pulley 121.

Briefly reviewing some of the utilitarian features of the disclosed invention it will initially be noted that the device is comparatively light and readily portable. The main load member 30 is provided with aligned pulleys 20 and 58 on opposed ends thereof to thereby accomplish all horizontal and vertical conductor pulls. The member 30 is extensible in that segment 34 may be moved longitudinally and pin 38 reset to aid in positioning pulley 58 in appropriate alignment with any conduit opening. Segment 32 may be made as long as desired by merely adding tubular segments thereto. Conduit receiving collars 60 and 62 are arranged to complementally receive standard conduit segments enabling the device to be appropriately braced against building structure regardless of variation thereof from job to job. In effect, therefore, the mounting of conduit segments to the collars 60 and 62 affords means for selectably spacing the device from wall and ceiling surfaces. The extensible and lockable feature of segments 32 and 34 complements the selectable reception of various conduit lengths in collars 60 and 62 in that it offers vernier length variation. Pivotal movement of member 30 combines with all of these features to assure easy bracing regardless of variation in building structure. Those skilled in the art of electrical construction will therefore understand the disclosed invention combines the desirable features of easy portability and a high degree of versatility to meet virtually all practical job requirements. The net result is a substantial increase in the efficiency of the conductor pulling operation and consequent important cost savings.

Having described a preferred embodiment of the invention it will be understood that various modifications may be made without departing from the scope of the appended claims.

What is claimed is:

1. In a power driven wire pulling device, a base member, a first axially elongated tubular member pivotally connected to the base member, a second tubular member telescopically received within said first member and movable axially relative thereto, first pulley means carried by the base for rotation thereon and below said first member, second pulley means carried by said second member adjacent the outer end thereof, power drivable reel means adapted for operable association with a pull line carried by one of said member and in operative relation with all of said pulley means, and means to lock said first and second members in selected positions relative to each other.

2. A power driven wire pulling device according to claim 1, wherein said reel means is carried by said first tubular member, said locking means comprising pin and slot connections between said first and second members, and coupling means accommodating selective spacer bar connection to the main member generally parallel to the axis of the main member and in generally perpendicular relative to the axis of the main member.

3. In a power driven wire pulling device, a base, a pulley journally connected to the base and having an axis of rotation generally parallel to the horizontal, a first load member extending above the base and having a pivotal connection to the base at the lower end of the first member, a second load member telescopically received within said first load member and movable axially relative thereto, a housing carried on the upper end of said second load member, a second pulley journally mounted to the housing and having an axis of rotation parallel to the axis of rotation of said first mentioned pulley, pin and slot connection means for selectively joining the members in various positions relative to each other to selectively lengthen or shorten the device, and power drivable reel means arranged for operative association with a pull line carried by the device intermediate the pulleys as seen in elevational view, the axis of pivot of said pivotal connection and the axis of rotation of said reel means being generally parallel to the axis of rotation of said pulleys.

4. A power driven wire pulling device, according to claim 3, and including cylindrical couplings secured to the housing and arranged for spacer bar connection to the device, the axis of said couplings being in perpendicular relation to each other.

5. A power driven wire pulling device according to claim 4, wherein said reel means is a capstan having an arcuate pull line contacting surface thereon, one edge of said surface being in alignment with the pulleys as seen in elevational view.

6. A power driven wire pulling device according to claim 3, wherein said housing comprises a plurality of walls, at least one of said walls being separable with another of said walls to facilitate assembly of the pull line.

7. In a power driven wire pulling device,
a base member,
a first axially elongated member connected to the base member,
a second axially elongated member associated with said first member and movable axially relative thereto,
first pulley means carried by the device adjacent one terminal aspect thereof,
second pulley means carried by the device adjacent the other terminal aspect thereof,
power drivable reel means adapted for operable association with a pull line and carried by one of said members intermediate said pulley means and in operative relation with all of said pulley means,
means to lock said first and second members in selected positions relative to each other,
said pull line being selectively and operatively associated with said pulley means to accomplish said wire pulling operation.

8. In a power driven wire pulling device,
a base member,
a first hollow axially elongated member movably connected to the base member,
a second axially elongated member telescopically associated with the first member and movable axially relative thereto,
first pulley means carried by the device adjacent one terminal aspect thereof,
second pulley means carried by the device adjacent the other terminal aspect thereof,
power drivable capstan means for operable driving association with a pull line and carried by said first member intermediate said pulley means,
means to lock said first and second members in selected positions relative to each other,
said capstan means being in operative relation with all of said pulley means whereby said pull line may be operatively associated with said pulley means to accomplish said wire pulling operation.

References Cited by the Examiner
UNITED STATES PATENTS

| | | | |
|---|---|---|---|
| 2,221,903 | 11/1940 | Abramson et al. | 254—134.3 |
| 2,286,781 | 6/1942 | Abramson et al. | 254—134.3 |
| 2,731,233 | 1/1956 | Lindsay | 254—134.3 |
| 2,948,510 | 8/1960 | Kieser | 254—134.3 |
| 3,072,382 | 1/1963 | Jones | 254—134.3 |
| 3,072,383 | 1/1963 | Vanderhagen | 254—134.3 |

WILLIAM FELDMAN, *Primary Examiner.*

MILTON S. MEHR, *Examiner.*